United States Patent Office 3,635,905
Patented Jan. 18, 1972

3,635,905
CYANIDE ION AS CATALYST FOR HETEROCYCLIC POLYMERS
Tad L. Patton, Baytown, Tex., assignor to Esso Research and Engineering Company
No Drawing. Continuation-in-part of applications Ser. No. 685,281, Nov. 24, 1967, and Ser. No. 796,221, Feb. 3, 1969. This application May 22, 1970, Ser. No. 41,656
Int. Cl. C08g 22/00
U.S. Cl. 260—77.5 R  53 Claims

ABSTRACT OF THE DISCLOSURE

Heterocyclic polymers containing either or both 4-imino1,3-imidazolidine - 2,5 - dione - 1,3 - diyl rings and/or 5 - imino - 1,3 - imidazolidine - 2,4 - dione - 1, 3 - diyl rings are produced in the presence of an added cyanide ion by the reaction of diisocyanates with hydrogen cyanide, by the reaction of dicyanoformamides with diisocyanates and by the polymerization of cyanoformamidyl isocyanates. The presence of the added cyanide ion produces heterocyclic polymers with substantially no cross-linking through the imino group of the imidazolidine rings.

CROSS REFERENCE TO RELATED APPLICATIONS

This is a continuation-in-part application of Ser. No. 796,221, filed Feb. 3, 1969, entitled "Cyanide Ion as Catalyst for Heterocyclic Polymers," and Ser. No. 685,281, filed Nov. 24, 1967, entitled "Synthesis of Cyanoformamidyl Isocyanates," both of which are now abandoned.

BACKGROUND OF THE INVENTION

(1) Field of the invention

The present invention is directed to an improved process for producing polymers containing 1,3-imidazolidine-1,3-diyl rings by the reaction of diisocyanates with hydrogen cyanide, by the reaction of diisocyanates with dicyanoformamides and by the polymerization of cyanoformamidyl isocyanates by carrying out any of the polymerization reactions in the presence of an added cyanide ion.

(2) Description of the prior art

The reaction of monoisocyanates with hydrogen cyanide is known as disclosed by W. Dieckmann et al., Berichte 38, 2977 (1905). It has been disclosed by S. Petersen in Annalen der Chemie 562, 205–226 (1949) that hexamethylene dicyanoformamide is formed by the reaction of hydrogen cyanide with hexamethylene diisocyanate.

An article in Die Macromolekulare Chemie, 78 186 (1964) by Oku et al. discloses:

"Starting from diisocyanates and hydrogen cyanide, poly(5-iminohydantoins) have been prepared by the following two methods. (1) Polyaddition between a diisocyanate and a di(carbamoyl cyanide), which corresponds to a 1:2 diisocyanate-hydrogen cyanide adduct. (2) Hydrogen cyanide-eliminating polymerization (polycondensation) of a di(carbamoyl cyanide). The former method generally gave more satisfactory results."

SUMMARY OF THE INVENTION

The present invention is directed to an improved process for producing polymers containing the following imidazolidine rings (below).

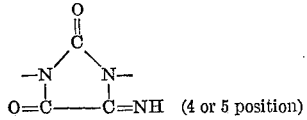

(4 or 5 position)

There are several methods which are set forth herein for preparing heterocyclic polymers containing these imidazolidine rings and each will be described in detail separately; however, each method according to the present invention utilizes an added cyanide ion as the catalyst.

(I) Polymers from reaction of hydrogen cyanide with a diisocyanate

Any of the following general procedures may be used to prepare polymers by the reaction of hydrogen cyanide with a diisocyanate:

(a) A solution containing a cyanide ion may be added to a solution of hydrogen cyanide and a diisocyanate in a solvent;

(b) Liquid or gaseous hydrogen cyanide or a solution of hydrogen cyanide and a solution of diisocyanate may be added to a solvent containing a cyanide ion; and (c) Hydrogen cyanide may be added as a gas, liquid or as a solution to a solution of a diisocyanate and a cyanide ion in a solvent.

The foregoing procedures are exemplary in nature. Further, they may be modified in detail, such as a procedure wherein the solution of hydrogen cyanide and solution of diisocyanate or mixture of diisocyanates are mixed in equal molar portions just prior to their addition to the catalyst solution of a cyanide ion in a solvent.

(II) Polymers from reaction of dicyanoformamides with diisocyanates

The heterocyclic polymers produced by reacting a dicyanoformamide or mixture of dicyanoformamides with a diisocyanate or mixture of diisocyanates in the presence of an added cyanide ion differ from the polymers made in Method I in the following ways:

(a) The polymers made from the reaction of a diisocyanate with a dicyanoformamide have imidazolidine rings on which the imino group is located on the position (alternately 4 and 5) adjacent to the ring N-atom which was derived from the diisocyanate. The position of the imino group on the imidazolidine rings regularly alternates between the 4 and 5 positions on sequential rings whereas the position of the imino group on sequential imidazolidine rings in polymers formed by Method I is randomly distributed between the 4 and 5 positions.

(b) If the organic moieties of the diisocyanate and the dicyanoformamide are different, the polymers have essentially an alternating 1:1 structure relative to the organic moieties of the diisocyanate and dicyanoformamide; whereas, polymers made by Method I (direct reaction of HCN with a mixture of two diisocyanates) have a 1:1 composition relative to the organic moieties of the diisocyanates, but the organic moieties would not necessarily occur in an alternating sequence.

(c) Further, two polymers may be produced which differ one from the other only by the position of the imino groups relative to the organic moieties by reacting a diisocyanate with a dicyanoformamide which has a different organic moiety and then reversing the organic moiety in the diisocyanate and the dicyanoformamide. In Method I where two diisocyanates are used, there would be random distribution of the imino groups between positions 4 and 5 in the imidazolidine rings particularly if the two diisocyanates had the same reactivities.

(III) Polymers from polymerization of cyanoformamidyl isocyanates

Heterocyclic polymers may be produced by the polymerization of cyanoformamidyl isocyanates in the presence of an added cyanide ion. The cyanoformamidyl isocyanates used in the polymerization have the general formula:

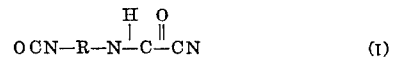

(I)

where: R is the organic moiety of the cyanoformamidyl isocyanate which may be aliphatic, alicyclic, aromatic or mixtures thereof and functionally substituted derivatives thereof provided the functional group does not react with the isocyanate group.

The polymers formed from cyanoformamidyl isocyanates differ structurally (with regard to the imino group) from those made by Methods I and II in that the imino group is regularly located as position 4 (or alternately position 5) of the 1,3-imidazolidine-1,3-diyl rings.

Following any of the methods set forth hereinabove, in the processes according to the present invention, the polymerizations are initiated and propagated by the addition of a cyanide ion. The added cyanide ion is obtained from a solution of a cyanide salt, preferably an alkali metal cyanide.

It has been found according to the present invention that in utilizing the cyanide ion as the catalyst that cross-linking by reaction of some of the imino groups in the imidazoldine rings with isocyanate groups is essentially eliminated during the polymerization. Accordingly, higher molecular weight polymers exhibiting no cross-linking may be produced by the process of the present invention.

DESCRIPTION OF THE PREFERRED EMBODIMENTS

To illustrate the present invention in all of its ramifications, each of the methods for producing the heterocyclic polymers containing the 1,3-imidazolidine-1,3-diyl rings will be considered individually. In each method, the polymerization process according to the present invention is initiated and propagated in the presence of an added cyanide ion.

(I) Reaction of hydrogen cyanide with diisocyanates

The diisocyanates which may be used in the reaction with hydrogen cyanide are characterized by the formula:

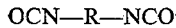

where: R is the organic moiety of the diisocyanate which may be aliphatic, alicyclic, aromatic or mixtures thereof and functionally substituted derivatives thereof provided the functional group does not react with an isocyanate group.

Thus, the diisocyanates may be selected from a broad group having a large variety of organic moieties. The organic moieties of the diisocyanates may be substituted with groups such as alkyl, aryl, halogens, sulfoxy, sulfonyl, alkoxy, aryloxy, oxo, ester, alkylthio, arylthio, nitro and the like which do not react with the isocyanate group. Functional groups which have reactive hydrogen atoms (e.g., carboxylic acids, phenols, amines, etc.) should not be present.

Each diisocyanate may be characterized by its specific organic moiety. For example, those diisocyanates having an aliphatic hydrocarbon moiety are exemplified by tetramethylene diisocyanate; hexamethylene diisocyanate; dodecamethylene diisocyanate; 2,2,4-(and 2,4,4-)-trimethylhexamethylene diisocyanate; and the like. Diisocyanates characterized by having aromatic hydrocarbon moieties are exemplified by m-phenylene diisocyanate; p-phenylene diisocyanate; biphenylene diisocyanate; 1,5-naphthalene diisocyanate; and the like. Diisocyanates having an alicyclic hydrocarbon moiety are 1,4-diisocyanato cyclohexane and 3-isocyanatomethyl-3,5,5-trimethylcyclohexyl isocyanate. The diisocyanates containing more than one type of hydrocarbon moiety are exemplified by toluene diisocyanate; durene diisocyanate; 4,4'-diphenylmethane diisocyanate; 3,3'-dimethyl-4,4'-biphenylene diisocyanate; 4,4'-diphenyl-isopropylidene diisocyanate; p-xylylene diisocyanate; m-xylylene diisocyanate; 4,4'-methylene bis(cyclohexyl isocyanate); 4-(4-isocyanato-cyclohexyl) phenylisocyanate; 4-isocyanatobenzyl isocyanate; and the like. It is noted that in the foregoing examples the isocyanate groups in each of the diisocyanates may be attached to the same or different hydrocarbon portions of the organic moiety. Further, diisocyanates which have organic moieties containing functional groups may also be used and are exemplified by 4,4'-diphenylsulfone diisocyanate; 4,4'-diphenylether diisocyanate; 3,3'-dimethoxy-4,4'-biphenylene diisocyanate; di(3-isocyanatopropyl)ether; tetrafluro-p-phenylene diisocyanate; tetrafluro-m-phenylene diisocyanate; 4,4'-diisocyanato-octaflurobiphenyl and the like. Mixtures of the diisocyanates may be used. Diisocyanate, as used herein, is a general class of compounds meant to include those compounds which have polymeric organic moieties such as the prepolymer diisocyanates which are used in the field of urethane polymers. Specific examples of the prepolymer diisocyanates are poly(ethylene- co-propylene adipate) end-capped with diphenylmethane diisocyanate, poly (propylene oxide) glycol end-capped with toluene diisocyanate, and poly(ethylene oxide) glycol end-capped with diphenyl methane diisocyanate. Further, specific diisocyanates which may be used in the present invention are found in patents, articles, or organic textbooks; a specific example being the paper "Mono and Polyisocyanates" by W. Siefken, Annalen der Chemie 562, 6-136 (1949), which is incorporated herein by reference.

The reaction of diisocyanates with hydrogen cyanide is referred to herein as the "one-shot" method. The "one-shot" method may be carried out by any of the general procedures set forth heretofore. The specific procedure selected depends on whether or not it is desired to further treat or use the polymer in solution or to precipitate the polymer directly from solution prior to its use or further reaction. It has been found that by proper selection of the reaction solvent(s) that the polymer may be precipitated from the reaction solution as it forms. If the solid polymer is desired, it is preferred as a polymerization procedure to add a solution containing a cyanide ion to a solution of hydrogen cyanide and a diisocyanate in a solvent(s) wherein the polymer will precipitate during its formation. The selection of the reaction solvent according to this procedure is a variable which may be used to effectively control the molecular weight of the polymer. In this procedure, the cyanide ion catalyst is derived from an alkali metal cyanide such as sodium cyanide dissolved in a solvent such as hexamethylphosphoramide, dimethylsulfoxide, dimethylacetamide, dimethylformamide or N-methylpyrrolidone. On the other hand, if it is desired to obtain the polymer in solution, a preferred procedure is to add simultaneously a hydrogen cyanide solution and the diisocyanate solution through a Y-shaped adaptor so that the reagents are mixed in equal molar quantities just prior to their being introduced into the reaction vessel which contains a solvent and the cyanide ion catalyst. In this procedure, the cyanide ion catalyst may be derived from an alkali metal cyanide such as sodium cyanide dissolved in the polymerization solvent. This procedure insures the mixing of the hydrogen cyanide with the diisocyanates just prior to their addition to the catalyst solution and produces polymers with the most desired properties.

(II) Reaction of dicyanoformamides with diisocyanates

Another method for producing heterocyclic polymers containing the imidazolidine rings referred to hereinabove is carried out by the reaction of dicyanoformamides with diisocyanates according to the present invention by initiating and propagating the reaction in the presence of an added cyanide ion. The diisocyanates used in this reaction may be selected from the diisocyanates set forth and illustrated above. The dicyanoformamides are prepared by reaction of hydrogen cyanide with these same diisocyanates and have the following general structure:

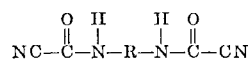

where: R is the organic moiety of the diisocyanate from which the dicyanoformamide was prepared.

The reaction of a dicyanoformamide or a mixture of diisocyanate or a mixture of diisocyanates to produce the heterocyclic polymers of the present invention can be caried out by adding a solution of cyanide ion catalyst to the reaction solution of the dicyanoformamide and diisocyanate or by adding the diisocyanate solution and a solution of the dicyanoformamide to the cyanide ion catalyst in a solvent. Preferably, the latter technique is used with the addition of the solution of diisocyanates and the solution of dicyanoformamide being controlled such that the monomer solutions are added simultaneously and in equal molar amounts. Since the reaction is exothermic, the reaction temperature is more easily controlled when the preferred technique is used.

The heterocyclic polymers produced by the reaction of a dicyanoformamide with a diisocyanate contain repeating units which include two imidazolidine rings and the organic moiety ($R_1$) from the diisocyanate and the organic moiety ($R_2$) from the dicyanoformamide. The polymer thus may be characterized by the following general repeating unit:

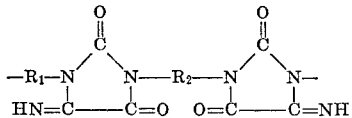

where:

$R_1$ is the organic moiety from the diisocyanate, and
$R_2$ is the organic moiety from the dicyanoformamide.

The polymers produced by this step-growth polymerization method are further generally characterized by the methodical alternation of the oxo and imino groups between positions 4 and 5 on the sequential imidazolidine rings in the polymer chains. The mode of formation of the imidazolidine rings is considered to be responsible for this alternating regularity. Generally, the two imidazolidine rings are formed with the oxo and imino groups ultimately being located at positions 4 and 5, respectively, on one imidazolidine ring and at positions 5 and 4, respectively, on the succeeding imidazolidine ring. On every imidazolidine ring, each imino group will be attached to the carbon atom adjacent to the nitrogen atom which was derived from the diisocyanate.

When the organic moiety of the diisocyanate differs from the organic moiety of the dicyanoformamide, polymers having isomeric structures may be produced by exchanging the organic moieties of the two reagents of monomers. This may be best illustrated by the following specific examples where equimolar quantities of the dicyanoformamide and diisocyanates are employed.

In the case of the reaction of hexamethylene dicyanoformamide (illustrating a dicyanoformamide having an aliphatic organic moiety) with 4.4'-diphenylmethane diisocyanate (illustrating a diisocyanate having a mixed hydrocarbon moiety), a polymer having the following repeating units is produced:

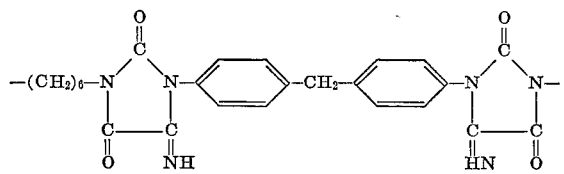

The structural isomer of the foregoing polymer may be prepared by reversing the organic moieties in the monomers; thus, the reaction of equimolar parts of hexamethylene diisocyanate and 4,4'-diphenylmethane dicyanoformamide forms a polymer having the following repeating units:

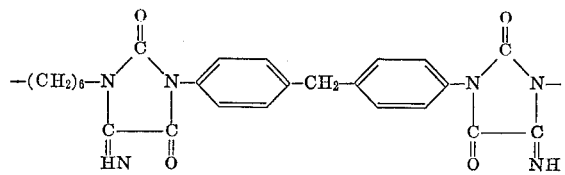

It has been found, that the most reactive diisocyanates and dicyanoformamides are those in which the organic moiety is aromatic.

(III) Polymerization of cyanoformamidyl isocyanates

A third method for producing the heterocyclic polymers containing the imidazolidine rings referred to hereinabove is the head-to-tail polymerization of cyanoformamidyl isocyanates. According to the present invention, this polymerization is initiated and propagated in the presence of an added cyanide ion. The cyanoformamidyl isocyanates have the following general structure.

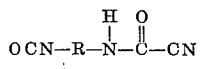

where: R is the organic moiety of the diisocyanate from which the cyanoformamidyl isocyanate was prepared:

The reaction of two moles of hydrogen cyanide with one mole of diisocyanate produces the dicyanoformamides. On the other hand, the formation of cyanoformamidyl isocyanates (the mono adduct of the diisocyanate) involves the reaction of only one mole of hydrogen cyanide with one mole of diisocyanate. Cyanoformamidyl isocyanates of the above formula may be prepared by reacting one mole of a diisocyanate in a solvent such as benzene, toluene, xylene, chlorobenzene, and mixtures thereof with petroleum ether, hexane, and other aliphatic solvents in which the cyanoformamidyl isocyanate is insoluble with one mole of hydrogen cyanide at a temperature between —10° and 35° C. in the presence of a catalyst such as dibutyl tin diacetate, dibutyl tin bis(isooctylmaleate), 2- picoline, pyridine, lutidine, N,N-dimethylaniline, 2,6-diethylaniline, quinoline or the like.

The heterocyclic polymers produced by the polymerization of a cyanoformamidyl isocyanate or mixtures of cyanoformamidyl isocyanates are made up of repeating units which may be characterized by the following general repeating unit:

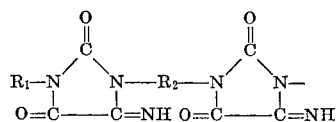

where:

$R_1$ and $R_2$ are the organic moiety from the cyanoformamidyl isocyanate
amidyl isocyanate.

The polymers produced by the polymerization of a single cyanoformamidyl isocyanate will have repeating units where $R_1$ and $R_2$ are the same; however, $R_1$ and $R_2$ may be different if a mixture of cyanoformamidyl isocyanates are used. The polymers produced by the polymerization of cyanoformamidyl isocyanates are thus generally characterized by the imino and oxo groups on the imidazolidine rings being located in the same positions (4 and 5 respectively) on each sequential imidazolidine ring. The particular structure of the polymers produced using a mixture of cyanoformamidyl isocyanates is dependent upon the reactivity of the respective cyanoformamidyl isocyanates so that block or random copolymers may be produced.

GENERAL REACTION CONDITIONS

The foregoing reactions are carried out under ambient temperatures and pressure and anhydrous conditions; however, the reactions are exothermic so that cooling may be required. While the reactions may be started at temperatures from 0° to 60° C., preferably 10° to 40° C., the temperature is controlled so as not to exceed 140° C., and preferably 90° C. At elevated temperatures, pressure equipment may become necessary due to the volatility of hydrogen cyanide (B.P. 25° C.). These reactions may be carried out under a blanket of inert gas such as nitrogen.

The synthesis of the heterocyclic polymers produced by the reaction of diisocyanates with hydrogen cyanide or the reaction of diisocyanates with dicyanoformamides or by the polymerization of cyanoformamidyl isocyanates may be carried out in a wide variety of solvents or mixtures of solvents. Whether the polymer remains in a solution or precipitates from solution during its formation is determined by the solvent or mixture of solvents used in the polymerization reaction. The molecular weight of a particular heterocyclic polymer made by any of the foregoing reactions is, to some extent, dependent upon the solubility of the polymer in the solvent or mixture of solvents used as a reaction medium. It is generally recognized that the solubility of a polymer decreases as the molecular weight of that polymer increases. Since the solubility properties of the heterocyclic polymers of the present invention will be effected by the structure of the organic moiety or moieties between the heterocyclic rings, the solubility of a series of these polymers in a single solvent or mixture of solvents may vary. Generally, the heterocyclic polymers having aliphatic moieties are soluble in a greater variety of solvents than the heterocyclic polymers having aromatic moieties. It may be generally stated that the foregoing reactions may be carried out in any aprotic solvent which does not react with isocyanates or hydrogen cyanide under the conditions of the reaction.

If a solvent in which the polymer is completely soluble is chosen for the reaction medium, then the quantity of solvent used per unit quantity of polymer prepared will be determined by the viscosity of the final polymer solution which can be tolerated for efficient stirring. Dipolar aprotic solvents such as dimethylformamide, dimethylacetamide, dimethylsulfoxide, hexamethylphosphoramide, N-methylpyrrolidone, butyrolactone and the like and mixtures thereof are illustrative of solvents in which all of the heterocyclic polymers made by the foregoing reactions remain in solution. Hence, these dipolar aprotic solvents are suitable for obtaining high molecular weight heterocyclic polymers in which the organic moiety or moieties may have any structure.

Some pure solvents in which a particular polymer has limited solubility may be used as reaction media also. Methyl benzoate, ethyl benzoate, nitrobenzene, and dimethylphthalate are solvents of this category which may be used. In these solvents, the polymer product may precipitate from solution as it forms. The molecular weight of the polymer may be controlled by the proper selection of reaction conditions and the reaction solvent or solvent mixture used as the reaction media. The solubilities of the heterocyclic polymers in the dipolar aprotic solvents mentioned above may be altered by dilution with essentially non-polar aprotic solvents in which the polymers have little or no solubility such as benzene, toluene, xylene, ethyl acetate, anisole, tetrahydrofuran, dioxane, and the like. By using a solvent such as nitrobenzene diluted with a solvent such as benzene or toluene, the polymers can be made to precipitate from solution during their formation and using specific reaction conditions the molecular weight of the polymers can be controlled by the ratio of the two solvents in the mixture.

Although the heterocyclic polymers produced according to the present invention can be made in a wide variety of solvents, the cyanide salts from which the cyanide ion is derived have little or no solubility in many of the solvents. It has been demonstrated that the cyanide ion is the catalyst for the polymerization. Hence, it is necessary that the cyanide salt be soluble in a solvent which makes available the cyanide ion. The solubilities of several cyanide salts in various kinds of solvents are set forth in Table I.

TABLE I.—SOLUBILITY[1] OF CYANIDE SALTS IN VARIOUS SOLVENTS
[(Concentration expressed in mg. CN⊖/ml.)]

|  | NaCN | KCN | $Zn(CN)_2$ | $Cu^I(CN)$ | $Cd(CN)_2$ | AgCN |
|---|---|---|---|---|---|---|
| Hexamethylphosphoramide | 7.25 | 0.18 | 2.27 | 0.11 | 2.04 | 0.12 |
| Dimethylsulfoxide | 6.74 | 3.11 | 2.69 | 0.11 | 1.61 | 0.05 |
| Dimethylformamide | 4.2 | 0.36 | 0.18 | 0.08 | 0.14 | <0.01 |
| Dimethylacetamide | 3.09 | 0.16 | 0.21 | 0.11 | 0.15 | <0.01 |
| N-methylpyrrolidone | 2.23 | 0.11 | 0.25 | 0.09 | 0.07 | <0.01 |
| Butyrolactone | 0.15 | 0.13 | <0.01 | 0.07 | <0.01 | <0.01 |
| Acetonitrile | <0.01 | <0.01 | <0.01 | <0.01 | <0.01 | <0.01 |
| Dimethylphthalate | <0.01 | <0.01 | <0.01 | <0.01 | <0.01 | <0.01 |
| Nitrobenzene | <0.01 |  |  |  |  |  |
| Toluene | <0.01 |  |  |  |  |  |

[1] The solubilities were determined by measuring the concentration of cyanide ion in the various solvents saturated with the dry cyanide salts. A polarographic oxidation procedure was used.

It can be seen from Table I that sodium cyanide is the most soluble cyanide salt in all the solvents tested. The preferred solvents for the cyanide salts are the dipolar aprotic solvents such as hexamethylphosphoramide, dimethylsulfoxide, tetrahydrothiophene dioxide, dimethylformamide, dimethylacetamide, and N-methylpyrrolidone. When these dipolar aprotic solvents are used as the reaction solvent, they may also be used as the vehicle for the cyanide salt. However, it is clear that if nitrobenzene, toluene, and the like are used as the reaction solvent, the cyanide salt must first be dissolved in a solvent which makes available the cyanide. This solution is then mixed with the polymerization reactants.

In the polymerization reactions, a suitable amount of cyanide ion to use in the reaction of hydrogen cyanide with a diisocyanate or in the "one-shot" reaction is $10^{-2}$ to $10^{-4}$, preferably $5 \times 10^{-3}$ to $5 \times 10^{-4}$, mole of cyanide ion per mole of diisocyanate. In the reaction of dicyanoformamides with diisocyanates the amount of cyanide ion found suitable is $2 \times 10^{-2}$ to $2 \times 10^{-4}$, preferably $10^{-2}$ to $10^{-3}$, mole of cyanide ion per mole of diisocyanate. The amount of cyanide ion suitable in the polymerization of cyanoformamidyl isocyanates is $10^{-2}$ to $10^{-4}$, preferably $5 \times 10^{-3}$ to $5 \times 10^{-4}$, mole of cyanide ion per mole of cyanoformamidyl isocyanate.

In the production of the heterocyclic polymers according to the present invention, the formation of each heterocyclic ring in the polymer chain may occur by a series of three concerted reactions when catalyzed by the cyanide ion. These reactions are illustrated as follows:

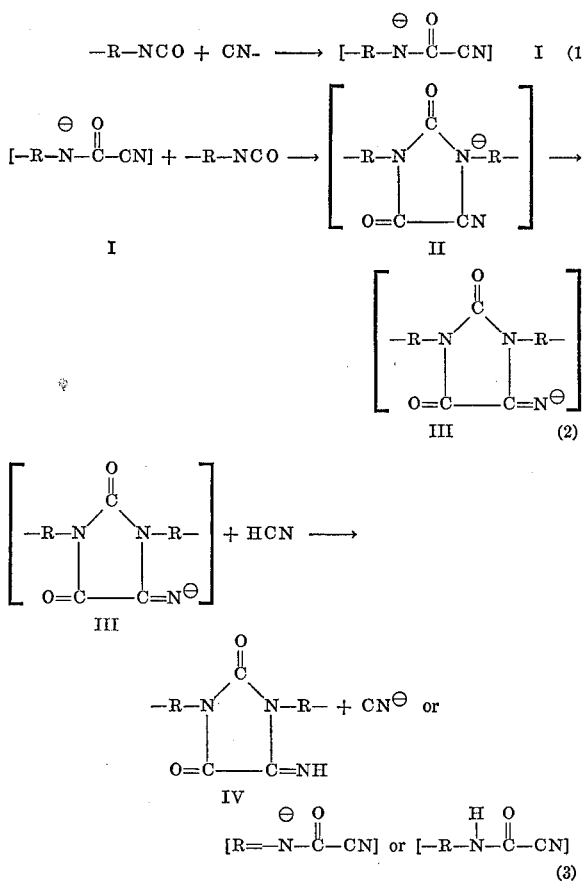

It has been observed generally that ring closure to form the imidazolidine ring is slower when the organic moiety of the diisocyanate is aliphatic. As illustrated in the reaction (2) above, the intermediate cyanoformylurea anion may be more easily cyclized when the organic moiety is an electron withdrawing group such as an aromatic ring. There is evidence that in some instances there is not complete ring closure of all the cyanoformylurea linkages to form the imidazolidine rings and it may be that a cyanoformylurea intermediate (shown below as V) is formed from the anion (II) by the abstraction of hydrogen from hydrogen cyanide or from a cyanoformamide group. The ring closure reaction is known to be easily catalyzed with a tertiary amine. This reaction is illustrated by the following:

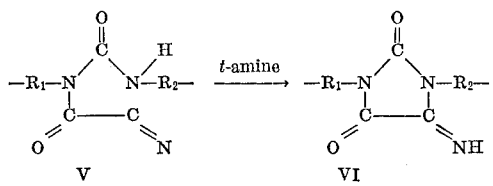

Accordingly, after the polymerization reaction has subsided, usually 5–120 minutes after the addition of all reagents is complete, a tertiary amine may be added to the reaction solution. The purpose of the amine is to insure the cyclization of all cyanoformylurea linkages in the polymer chain to 4-imino-1,3-imidazolidine-2,5-dione rings. Exemplary tertiary amines are triethylamine, trimethylamine, N-methyl morpholine, N-methyl piperidine, triethylenediamine, etc.

Bases such as N,N-dialkylanilines, pyridine, picoline, and lutidine may be used but are less effective than the aliphatic tertiary amines. The quantity of t-amine added to the reaction solution may be 0.0005 (preferably 0.001– 0.05) molar equivalents of the isocyanate groups used in the reaction.

After adding the t-amine, the reaction solution is stirred from five minutes to ten hours, but preferably ten to sixty minutes. The temperature does not rise. The temperature of the reaction solution when the t-amine is added is preferably 20–90° C., and the most preferable temperature range is 20–50° C.

When the reaction is carried out in a solvent wherein the heterocyclic polymer precipitates during formation, the polymer may be treated either before or after the precipitated polymer is filtered with a compound such as an alcohol, secondary amine, or primary amine which will react with the unreacted isocyanate groups. Likewise, a heterocyclic polymer which is soluble in the reaction solution may be treated with a compound which will react with the unreacted isocyanate groups before precipitating the polymer from the reaction solution.

The heterocyclic polymer is filtered and washed if it precipitates from the reaction solution during its formation. If it remains soluble in the reaction solvent, it is then precipitated by pouring the reaction solution into a reactive solvent such as methanol, ethanol, propanol, 1–2% ammonium hydroxide, primary and secondary amines, or water, or into a nonreactive solvent such as benzene, toluene or acetone. The reactive solvent will react with the terminal isocyanate groups to form carbamates, ureas, or amines which will prevent further reaction and undesirable side reactions. A more stable polymer is produced when it is precipitated in a reactive solvent.

The "one-shot" reaction of hydrogen cyanide with a diisocyanate, the reaction of dicyanoformamide with diisocyanates and the polymerization of cyanoformamidyl isocyanates are illustrated by the following examples which are set forth for illustration and are not to be considered as limiting the present invention. All inherent viscosities given in all examples were measured in dimethylformamide at a concentration of 0.5 g. polymer per 100 ml. at 25° C. Intrinsic viscosities as set forth in the examples were measured in dimethylformamide at 25° C.

Example 1

A solution of 4.4 g. (0.165 mole) of hydrogen cyanide and 41.6 g. (0.165 mole) of diphenylether diisocyanate in 437 ml. dry nitrobenzene and 23 ml. dry toluene was put in a closed 3-necked flask with 0.1 g. dry powdered sodium cyanide. The initial temperature was 16° C. and it increased to 24° C. during the next 4 hours. The reaction solution remained clear with no apparent change in viscosity for 5 days (120 hours). At that time 50 ml. of the solution was removed. Part of it was poured into petroleum ether and part into methanol to precipitate polymer. No precipitates were obtained in either case and the reaction solution smelled strongly of starting materials.

Then 2 ml. of N-methylpyrrolidone saturated with sodium cyanide was added to the remaining part of the 5-day-old reaction solution. Heat was evolved immediately, and the temperature increased from 26° to 46° C. in one minute. After 2 minutes polymer began to precipitate from solution as expected. After 10 minutes the product was filtered, washed with methanol and dried. The colorless polymer had an inherent viscosity of 0.56.

This demonstrates conclusively that solid sodium cyanide will not catalyze formation of polymer under the above conditions. Furthermore, it demonstrates that it is necessary for the cyanide salt to be soluble in a solvent which makes available the cyanide ion which is the catalyst for the polymerization.

Example 2

Hydrogen cyanide was bubbled through a solution of 20 g. of diphenylmethane diisocyanate, 0.05 g. sodium cyanide, and 192 g. of N-methylpyrrolidone. No attempt was made to control the temperature which spontaneously rose from room temperature to 64° C. After 30 minutes the reaction solution was cooled to room temperature.

Since the quantity of hydrogen cyanide bubbled through the solution was not measured, no material balance was possible.

Part of the solution was poured into toluene to precipitate 5 g. of Product A. The remainder of the reaction solution was poured into water to precipitate 9 g. (Product B) which had an inherent viscosity of 0.75.

Both Products A and B were soluble in dimethylformamide and in N-methylpyrrolidone when they had just been made; however, after one week Product A was insoluble in both solvents. This indicated that the polymer had cross-linked. Cross-linking probably occurred by reaction of the unreacted isocyanate end groups with the imino groups on the heterocyclic rings. The solubility of Product B did not change with time; here the residual isocyanate groups on the polymer had been hydrolyzed to amino groups during the precipitation in water and a cross-linking reaction could not occur.

It was concluded from this data that the cyanide ion effectively catalyzed the formation of the desired heterocyclic polymer in the polymerization process by the "one-shot" technique. Clear tough films were cast from solutions of Products A and B.

Example 3

A solution of 100 g. of diphenylmethane diisocyanate in 250 g. of N-methylpyrrolidone and a solution of 12 g. of hydrogen cyanide in 165 g. of N-methylpyrrolidone were placed in separate addition funnels mounted on a Y-shaped adapter so that when they were added they were mixed just prior to contact with the catalyst solution. The catalyst solution was prepared by adding 5 ml. of a saturated solution of sodium cyanide in N-methylpyrrolidone to 200 g. of the same solvent.

The reaction temperature was controlled at 40° C. The additions required 45 minutes. Ten minutes after the additions were complete part of the viscous solution was poured into toluene to precipitate 15 g. of Product A which had an inherent viscosity of 1. The remainder of the solution was precipitated in water to give a colorless polymer, Product B, having an inherent viscosity of 0.70.

The products were apparently not completely cyclized, because during hydrolysis of Product B the molecular weight decreased so that the inherent viscosity was 0.12.

The first product (A) was redissolved in dimethylformamide and treated with triethylamine for 10 minutes to eliminate the factors responsible for polymer degradation during hydrolysis. After precipitation in toluene, it (Product C) had an inherent viscosity of 1 (unchanged) which was the same as when it was initially precipitated. A portion of C was then hydrolyzed, and the product had an inherent viscosity of 0.80.

Although polymers are formed by cyanide ion catalyst alone, treatment of the polymer product with a tertiary amine, stabilized the polymer so that degradation did not occur during hydrolysis.

The foregoing example illustrates a preferred addition of the reactants. The following examples illustrate various modifications which can be made in the present invention.

Example 4

A solution of 53 g. of hydrogen cyanide in 184 ml. of N-methylpyrrolidone and a solution of 490 g. of 4,4'-diphenylmethane diisocyanate in 1000 ml. of N-methylpyrrolidone were added dropwise and simultaneously to a solution of 6000 ml. of N-methylpyrrolidone which contained 25 ml. of a saturated solution of sodium cyanide in the same solvent. The addition required 7 minutes. The temperature rose to 45° C. and the solution became viscous. Thirty minutes after the addition was complete 20 g. of triethylamine was added to the reaction solution; no temperature rise was noted. After stirring an additional thirty minutes, 30 ml. of anhydrous methanol was added to react with the unreacted isocyanate groups. The product was then precipitated in toluene. The dry white powder weighed 532 g. (98% yield). It had an intrinsic viscosity of 1.14. The thermographimetric analysis showed that the dry material underwent 5% weight loss at 362° C. A film cast from dimethylformamide had a tensile strength of 14,750 p.s.i. and a 1% secant modulus of 404,000 p.s.i.

Example 5

A solution of 65 g. of hydrogen cyanide in 150 ml. of N-methylpyrrolidone and a solution of 606.9 g. of 4,4'-diphenylether diisocyanate in 1000 ml. of N-methylpyrrolidone were added simultaneously to a solution of 3000 ml. of N-methylpyrrolidone containing 25 ml. of the same solvent saturated with sodium cyanide. The addition required 7 minutes, after which an additional 4500 ml. of solvent was added to the very viscous reaction solution. Triethylamine (24 g.) in 75 ml. of N-methylpyrrolidone was added to the polymer solution 105 minutes after the addition of reagents was complete, and 37 minutes later the polymer was precipitated in methanol. It was filtered and washed with methanol. After drying, the pale yellow product weighed 670 g. (quantitative yield). The polymer had an inherent viscosity of 1.25.

*Analysis.*—Calculated for $(C_{15}H_9N_3O_3)_n$ (percent): C, 64.52; H, 3.25; N, 15.04. Found (percent): C, 64.32; H, 3.10; N, 14.81.

The polymer exhibited good oxidative stability at 200° C. Films cast from dimethylformamide solution had a tensile strength of 13,000 p.s.i.

Example 6

The polymer prepared in this example is made from a mixture of 80 mole percent 4,4'-diphenylmethane diisocyanate and 20 mole percent of hexamethylene diisocyanate. A solution of 65 g. of hydrogen cyanide and 80.7 g. of hexamethylene diisocyanate in 146 ml. of N-methylpyrrolidone and a solution of 480 g. of 4,4'-diphenylmethane diisocyanate in 1000 ml. of N-methylpyrrolidone were added simultaneously to 4000 ml. of N-methylpyrrolidone containing 25 ml. of the same solvent which had been saturated with sodium cyanide. The addition required 6 minutes and the exothermic reaction raised the temperature from 24° C. to 55° C. Additional (1000 ml.) solvent was added to dilute the viscous reaction solution. Later, 24.2 g. of triethylamine in 75 ml. of N-methylpyrrolidone were added. No temperature increase was observed. Methanol was added to the reaction solution and the product was precipitated in water. The product was filtered, washed with water, and finally washed with methyl alcohol. The yield of dry product was 97% of theoretical. It had an inherent viscosity of 0.32.

Example 7

A solution of 65 g. of hydrogen cyanide in 160 g. of N-methylpyrrolidone was added simultaneously with 403 g. of hexamethylene diisocyanate to 1,000 ml. of N-methylpyrrolidone to which was added 25 ml. of a saturated solution of sodium cyanide in N-methylpyrrolidone. The additions required 12 minutes and the reaction temperature rose to 36° C. Triethylamine (24.2 g.) in 50 ml. of N-methylpyrrolidone was added to the reaction solution 2 hours after the addition of reagents was completed. After stirring 5 hours, 63 g. of dry methanol was added dropwise to the reaction solution to react with unreacted isocyanate groups. The product was precipitated in water, washed with water, and dried. The product was soft and cohesive. It was stirred with acetone in a Waring Blendor, filtered and dried. The dry white powder represented a yield of 77%. The polymer had an inherent viscosity of 0.29. The polymer was shown to be crystalline by X-ray analysis. TGA analysis showed that the product was stable up to 320° C.

*Analysis.*—Calculated for $(C_9H_{13}N_3O_2)_n$ (percent): C, 55.38; H, 6.71; N, 21.52; Found (percent): C, 55.55; H, 7.10; N, 20.77.

Example 8

This is a synthesis of a 50–50 copolymer of diphenylmethane diisocyanate and hexamethylene diisocyanate by their reaction with hydrogen cyanide using the "one-shot" technique. A solution of 100 g. of N-methylpyrrolidone containing 1 ml. of a saturated sodium cyanide solution in N-methylpyrrolidone was placed in a flask fitted with two dropping funnels and a stirrer. In one funnel was placed a solution of 8.1 g. of hydrogen cyanide in 90 g. of N-methylpyrrolidone. In the other dropping funnel was placed a solution of 26.1 g. of hexamethylene diisocyanate and 37.5 g. of diphenylmethane diisocyanate in 130 g. of N-methylpyrrolidone. The contents of the dropping funnels were dropped at a rate such that both were depleted at the same time. The solution in the flask was heated to 50° C. before the addition was started and the temperature increased to 76° during the addition which required 30 minutes. Ten minutes before the addition was complete 20 g. of N-methylpyrrolidone and 5 g. of triethylamine were added. The temperature jumped from 63 to 76° C. The product was isolated by pouring it into toluene and petroleum ether. The yield of product was 97%, and it had an inherent viscosity of 0.39.

In the following examples, diisocyanates are reacted with dicyanoformamides according to the present invention.

Example 9

To a solution of 2.5 g. of diphenylmethane diisocyanate, 3.04 g. of diphenylmethane dicyanoformamide in 20 ml. of N-methylpyrrolidone was added 0.5 ml. of a saturated solution of sodium cyanide in N-methylpyrrolidone. Within two minutes the solution was too viscous to stir. It was diluted with six volumes of N-methylpyrrolidone and stirred to dissolve the polymer. The resulting solution was poured into water to precipitate 3 g. of polymer which had an inherent viscosity of 0.29. The polymer was soluble in dimethylformamide and other dipolar aprotic solvents.

Example 10

To a solution of 3.48 g. of toluene diisocyanate and 4.56 g. of toluene dicyanoformamide in 50 ml. of dimethylformamide was added 1 ml. of a saturated solution of sodium cyanide in dimethylformamide. Heat was liberated and the solution became viscous very rapidly. The product was precipitated in water, washed with methanol and toluene and finally dried. The yield was 7.4 g. (92% yield). It had an inherent viscosity of 0.25.

In the following example, a cyanoformamidyl isocyanate is polymerized according to the present invention.

Example 11

To a solution of 1 g. of toluene cyanoformamidyl isocyanate in 3 ml. of dimethylformamide at room temperature was added 0.5 ml. of dimethylformamide saturated with sodium cyanide. Heat was liberated. After a few minutes the solution was poured into toluene to precipitate a polymer. The infrared spectrum of the product exhibits absorption maxima at 3.05, 5.55, 5.74, and 5.98 microns, characteristic of the 4-imino-1,3-imidazolidine-2,4-dione ring.

The following example illustrates that if a cyanide ion is not used in the polymerization by the "one-shot" technique a highly cross-linked polymer is formed.

Example 12

A stream of dry hydrogen cyanide was slowly bubbled through a cold (6° C.) solution of 50.4 g. (0.2 mole) of 4,4'-diphenylmethane diisocyanate in 100 ml. of pyridine in a nitrogen atmosphere. The temperature was controlled between 6° and 10° C. The addition of 0.25 mole (0.05 mole excess) of hydrogen cyanide required 81 minutes, and at this point the reaction solution was very viscous. Methyl alcohol (5 ml.) was then added. The clear reaction solution was poured into petroleum ether and toluene in a Waring Blendor to form a finely divided yellow powder. The yield was 56 g. (quantitative). The infrared spectrum did not reveal the presence of an isocyanate group, thus implying either that the molecular weight was very high and/or that considerable cross-linking occurred. The insolubility of the product in chloroform, acetone, methylethyl ketone, isopropanol, tetrahydrofuran, ethyl acetate, formic acid, chlorobenzene, O-dichlorobenzene, m-cresol, pyridine, dimethylformamide (swelling), hexamethylphosphoramide (swelling) and dimethylsulfoxide (swelling) indicated that the product was cross-linked.

Example 13

Twenty-five ml. of N-methylpyrrolidone saturated with potassium cyanide was added to 1,200 ml. of N-methylpyrrolidone. Then a solution of hydrogen cyanide in 175 ml. of N-methylpyrrolidone and a solution of 68.3 g. of 4,4'-diphenylether diisocyanate and 182.3 g. of hexamethylene diisocyanate in 800 ml. of N-methylpyrrolidone were added simultaneously to the cyanide solution. The additions required 13 minutes, and the temperature rose to 68° C. After the temperature dropped to 52° C. (37 minutes after the additions were completed), 15 g. of triethylamine were added. The temperature continued to drop. The reaction solution was poured into methanol to precipitate the polymer which had an inherent viscosity of 0.38.

This example illustrates that a cyanide salt other than sodium cyanide makes available the cyanide ion which will catalyze the reaction.

Examples 2–13 have illustrated the cyanide ion as the catalyst for the reaction of hydrogen cyanide with diisocyanates, the reaction of diisocyanates with dicyanoformamides and the polymerization of cyanoformamidyl isocyanates in solvents wherein the polymer produced was completely soluble. As illustrated in the various examples, different addition techniques are possible when using these solvents. While N-methylpyrrolidone was used in most examples, dimethylformamide, dimethylacetamide, dimethylsulfoxide, hexamethylphosphoramide, and the like may be used with substantially the same results.

In the following examples, the wide variety of solvents in which these reactions may be carried out are illustrated.

Example 14

A solution (10 ml.) of N-methylpyrrolidone saturated with sodium cyanide was added to a solution of 5.0 g. of hydrogen cyanide and 46.6 g. of diphenylether diisocyanate in 516 ml. of benzene. Precipitation of polymer began immediately after addition of the catalyst, and the temperature increased from 17 to 28° C. After 30 minutes, the polymer was collected on a filter, washed with methanol, and dried. The polymer had an inherent viscosity of 0.41.

Example 15

To a solution of 7.5 g. of hydrogen cyanide and 65.5 g. of 4,4'-diphenylether diisocyanate in 1000 ml. of methyl benzoate was added 10 ml. of N-methylpyrrolidone saturated with sodium cyanide. The mole ratio of sodium cyanide to diisocyanate was $3.3 \times 10^{-3}$. The temperature increased from 19 to 40° C. and a precipitate began to form within one minute after the addition of the catalyst. After a total reaction time of 45 minutes, the colorless polymer was collected on a filter. The polymer had an inherent viscosity of 0.96.

When this experiment was repeated using ethyl benzoate instead of methyl benzoate for the solvent, a polymer was similarly obtained which had an inherent viscosity of 0.17. These examples show that the molecular weight of the polymer may be different in each solvent.

Example 16

A solution of 5 ml. of N-methylpyrrolidone saturated with sodium cyanide was added to a solution of 11.5 g. of hydrogen cyanide and 70.5 g. of hexamethylene diisocyanate in 500 ml. of dry acetonitrile. The temperature increased from 20 to 80° C. and polymer precipitated from solution. After 30 minutes, it was collected on a filter, washed with water and methanol and dried. The yield was 74 g. The polymer had an inherent viscosity of 0.61.

Example 17

A solution (2.73 ml.) of hexamethylphosphoramide saturated with sodium cyanide was added to a stirred solution of 5.13 g. of hydrogen cyanide and 47.9 g. of 4,4'-diphenylether diisocyanate in a mixture of 503 ml. nitrobenzene and 27 ml. of toluene. The temperature rose from 18 to 43° C. After 30 minutes, the polymer which had precipitated from solution was filtered, washed with methanol, and dried. It had an inherent viscosity of 0.89.

In this example, the mole ratio of cyanide ion to diisocyanate was $4 \times 10^{-4}$. This example illustrates the use of hexamethylphosphoramide as a vehicle for the cyanide salt.

Example 18

A solution (1.46 ml.) of dimethylsulfoxide saturated with sodium cyanide was added to a stirred solution of 5.6 g. of hydrogen cyanide and 47.8 g. of 4,4'-diphenylether diisocyanate in a mixture of 53 ml. of toluene and 476 ml. of nitrobenzene. Thus $2 \times 10^{-3}$ moles of cyanide ion per mole of diisocyanate was added to the reaction solution. The temperature increased from 17 to 44° C. and polymer began to precipitate from solution in a few minutes. After 30 minutes the polymer was collected on a filter, washed with methanol and dried. A 98% yield of polymer having an inherent viscosity of 1.7 was obtained.

This example illustrates the use of dimethylsulfoxide as a vehicle for sodium cyanide. When the quantity of catalyst solution added was one tenth of that in this example so that $2 \times 10^{-4}$ moles of cyanide ion per mole of diisocyanate was present, a polymer having an inherent viscosity of 0.36 was formed.

Examples 14–18 illustrate solvents wherein the polymers precipitates during the reaction. Further, a single solvent or mixed solvents may be used. The following examples illustrate the use of other solvents and the use of other monomers and mixtures thereof to produce different poly(iminoimidazolidinediones).

Example 19

Ten ml. of N-methylpyrrolidone saturated with sodium cyanide was added to a solution of 52 g. of 2,4-toluene diisocyanate and 8.5 g. of hydrogen cyanide in 600 ml. of dry nitrobenzene. The temperature increased from 19° C. to 54° C. within 1 minute. After 30 minutes, 500 ml. of methanol was added to the viscous solution to precipitate 53 g. of polymer which had an inherent viscosity of 0.45. A clear flexible film was cast from a dimethylformamide solution of it.

Using the same procedure and reaction conditions, hydrogen cyanide reacted with diphenylmethane diisocyanate to form a polymer which remained in solution. A polymer which had an inherent viscosity of 0.6 was precipitated from solution by the addition of methanol.

It is noted that in contrast to the above, that the reaction of diphenylether diisocyanate with hydrogen cyanide in nitrobenzene produced a polymer which precipitated from solution.

Example 20

A solution of 9.0 g. of hydrogen cyanide, 40.3 g. of diphenylether diisocyanate, and 40.0 g. of diphenylmethane diisocyanate in 990 ml. of nitrobenzene was prepared. Then 10 ml. of N-methylpyrrolidone saturated with sodium cyanide was added and the temperature increased from 20 to 43° C. The reaction solution became too viscous to stir. It was mixed with methanol to precipitate the polymer which had an inherent viscosity of 2.44.

Example 21

Ten ml. of a saturated solution of sodium cyanide in N-methylpyrrolidone was added to a solution of 9.5 g. of hydrogen cyanide and 83.1 g. of 4,4'-diphenylether diisocyanate in 1275 ml. of dimethylphthalate. The mole ratio of cyanide ion to diisocyanate was $2.57 \times 10^{-}$. The temperature of the stirred solution increased to 40° C. After 15 minutes, the viscous solution was diluted with methanol to precipitate the polymer which had an inherent viscosity of 0.71. The infrared spectrum of a thin film of the polymer was identical to that of the polymer made in Example 5.

This example illustrates the use of an ester from which the polymer must be precipitated by addition of antisolvent. It has also been shown that the above reaction proceeds in the same way when butyrolactone is the reaction solvent; here a polymer having an inherent viscosity of 0.57 was obtained.

Example 22

Ten ml. of N-methylpyrrolidone saturated with sodium cyanide was added to a solution of 8.0 g. of hydrogen cyanide and 50.4 g. of 4,4'-diphenylether diisocyanate in a mixture of 885 ml. of nitrobenzene and 100 ml. of N-methylpyrrolidone. The exothermic reaction was complete after 40 minutes and 500 ml. of methanol was added to precipitate the polymer. It was collected on a filter, washed with methanol, and dried. The polymer had an inherent viscosity of 1.4.

Analysis.—Calculated for $(C_{15}H_9N_3O_3)_n$ (percent): C, 64.52; H, 3.25; N, 15.04. Found (percent): C, 64.36; H, 3.29; N, 14.77.

This example illustrates the use of a mixture of N-methylpyrrolidone and nitrobenzene as the reaction solvent.

The following example again illustrates that the cyanide ion is the effective catalyst.

Example 23

Ten mg. of dry powdered sodium cyanide was added to a stirred solution of 4.8 g. of hydrogen cyanide and 42.8 g. of 4,4'-diphenylether diisocyanate in 938 ml. of nitrobenzene. No increase in temperature was observed after 3 minutes. Then 10 ml. of pure N-methylpyrrolidone was added to the solution. There was still no change in the temperature of the reaction solution. Then 10 ml. of N-methylpyrrolidone saturated with dry sodium cyanide was added. Immediately the exothermic reaction started and the temperature increased from 22° to 35° C. within one minute. Two minutes after the addition of the catalyst solution, the solution was too viscous to stir. It was mixed with methanol to precipitate the polymer. It was filtered, washed with methanol, and dried. The polymer product had an inherent viscosity of 1.2.

The process of the present invention is useful in making polymers which can be converted into films, fibers, foams, molded objects and the like. Films from the polymers of the present invention have been made by casting from solution or by forming under heat and pressure. The polymers are also useful in laminates and for making electrical insulators. The high temperature thermal stability of the polymers produced by the present invention allows them to be used in applications at elevated temperature. The outstanding physical properties and long-term stability at elevated temperature of some polymers made by the present invention demonstrate that the polymers are outstanding engineering plastics.

The nature and objects of the present invention having been completely described and illustrated and the best mode thereof set forth, what I wish to claim as new and useful and secure by Letters Patent is:

1. In a process for producing by the reaction of hydrogen cyanide and diisocyanate a heterocyclic polymer having a structure of alternating organic moieties and 1,3- imidazolidine-1,3-diyl rings, said rings being predominately of the group consisting of

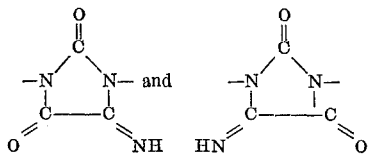

and these rings being randomly distributed in their sequence which comprises:
  initiating the reaction to form said polymer in the presence of an added cyanide ion.

2. A process according to claim 1 wherein said added cyanide ion catalyst is derived from an alkali metal cyanide.

3. A process according to claim 2 wherein said alkali metal cyanide is sodium cyanide.

4. A process according to claim 1 wherein hydrogen cyanide is reacted with at least one diisocyanate in the presence of a cyanide ion derived from sodium cyanide or potassium cyanide.

5. A process according to claim 4 wherein a solution of at least one diisocyanate and a solution of hydrogen cyanide are mixed just prior to their addition to a solution of said cyanide ion in a solvent.

6. A process according to claim 4 wherein hydrogen cyanide is bubbled through a solution of at least one diisocyaante containing said cyanide ion.

7. A process according to claim 4 wherein hydrogen cyanide is reacted with a mixture of diisocyanates having different organic moieties.

8. A process according to claim 1 wherein said reaction is initiated at a temperature from 0° to 60° C.

9. A process according to claim 1 wherein said reaction is carried out in a dipolar aprotic solvent.

10. A process according to claim 9 wherein said solvent is N-methylpyrrolidone.

11. A process according to claim 4 wherein said reaction is carried out in a dipolar aprotic solvent and the temperature is controlled so as not to exceed 140° C.

12. A process according to claim 4 wherein after the polymerization reaction has subsided, a tertiary amine is added to the reaction solution.

13. A process according to claim 12 wherein said amine is triethylamine.

14. A process according to claim 12 wherein said tertiary amine is added in an amount of at least about 0.0005 molar equivalent of the isocanate groups used in the reaction.

15. A process according to claim 2 wherein the polymer product is precipitated into a isocyanate-reactive solvent to eliminate the isocyanate groups.

16. A process according to claim 15 wherein said solvent is a lower alcohol.

17. A process according to claim 15 wherein said solvent is water.

18. A process according to claim 2 wherein an isocyanate reactive solvent is added to the polymer product to eliminate the isocyanate groups.

19. A process according to claim 18 wherein said reactive solvent is a lower alkyl alcohol.

20. A process according to claim 1 wherein said reaction is carried out in a mixture of aprotic solvents.

21. A process according to claim 20 wherein said reaction is initiated at a temperature from 0° to 60° C.

22. A process according to claim 20 wherein said heterocyclic polymer precipitates from the reaction solution.

23. A process according to claim 20 wherein said solvents are nitrobenzene and an aromatic selected from the group consisting of benzene, toluene and xylene.

24. A process according to claim 23 wherein said aromatic is toluene.

25. A process according to claim 1 wherein said reaction is carried out in acetonitrile.

26. A process according to claim 1 wherein said reaction is carried out in a solvent selected from the group consisting of methylbenzoate, ethylbenzoate, and dimethylphthalate.

27. In a process for producing by the reaction of diisocyanates with dicyanoformamides a heterocyclic polymer having a structure characterized by the following:

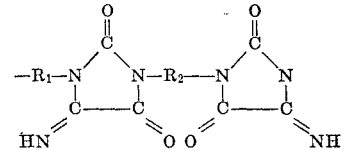

where: $R_1$ and $R_2$ are organic moieties from said diisocyanate and said dicyanoformamide which comprises:
  initiating the reaction to form said polymer in the presence of an added cyanide ion.

28. A process according to claim 27 wherein said added cyanide ion catalyst is derived from an alkali metal cyanide.

29. A process according to claim 28 wherein said alkali metal cyanide is sodium cyanide.

30. A process according to claim 27 wherein at least one dicyanoformamide and at least one diisocyanate are reacted in the presence of a cyanide ion derived from sodium cyanide or potassium cyanide.

31. A process according to claim 30 wherein a solution of a dicyanoformamide and a solution of a diisocyanate are added to a solution containing said cyanide ion.

32. A process according to claim 30 wherein a saturated solution of said cyanide ion in a solvent is added to a solution of at least one diisocyanate and at least one dicyanoformamide.

33. A process according to claim 30 wherein a mixture of diisocyanates is reacted.

34. A process according to claim 30 wherein a mixture of dicyanoformamides is reacted.

35. A process according to claim 30 wherein said reaction is carried out in a dipolar aprotic solvent and the temperature is controlled so as not to exceed 140° C.

36. A process according to claim 30 wherein after the polymerization reaction has subsided, a tertiary amine is added to the reaction solution.

37. A process according to claim 30 wherein the polymer product is precipitated into a reactive solvent to eliminate the isocyanate groups.

38. A process according to claim 37 wherein said solvent is a lower alkyl alcohol.

39. A process according to claim 37 wherein said polymer product is precipitated in water.

40. A process according to claim 30 wherein a reactive solvent is added to the polymer product to eliminate the isocyanate groups.

41. A process according to claim 40 wherein said reactive solvent is a lower alkyl alcohol.

42. In a process for producing by the polymerization reaction of cyanoformamidyl isocyanates a heterocyclic polymer having a structure characterized by the following:

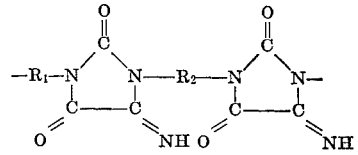

where: $R_1$ and $R_2$ are organic moieties from said cyanoformamidyl isocyanates
which comprises:
  initiating the reaction to form said polymer in the presence of an added cyanide ion.

43. A process according to claim 42 wherein said added cyanide ion catalyst is derived from an alkali metal cyanide.

44. A process according to claim 43 wherein said alkali metal cyanide is sodium cyanide.

45. A process according to claim 42 wherein a solution of at least one cyanoformamidyl isocyanate is polymerized in the presence of a cyanide ion derived from sodium cyanide or potassium cyanide.

46. A process according to claim 45 wherein a saturated solution of said cyanide ion in a solvent is added to a solution of at least one cyanoformamidyl isocyanate.

47. A process according to claim 45 wherein a solution of at least one cyanoformamidyl isocyanate is added to a solution containing said cyanide ion.

48. A process according to claim 45 wherein said reaction is carried out in a dipolar aprotic solvent and the temperature is controlled so as not to exceed 140° C.

49. A process according to claim 45 wherein after the polymerization reaction has subsided, a tertiary amine is added to the reaction solution.

50. A process for producing a heterocyclic polymer having a structure of alternating organic moieties and 1,3-imidazolidine-1,3-diyl rings, said rings being predominately of the group consisting of:

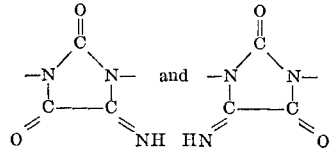

these rings being randomly distributed in their sequence which comprises:

adding a solution of a cyanide ion derived from an alkali metal cyanide to a solution of HCN and at least one diisocyanate in a dipolar aprotic solvent and carrying out a reaction between the HCN and diisocyanate in the presence of said added cyanide ion.

51. A process in accordane with claim 50 wherein the alkali metal is sodium or potassium.

52. A process in accordance with claim 51 wherein the dipolar aprotic solvent is dimethyl formamide and the added cyanide is sodium cyanide.

53. A process in accordance with claim 51 wherein the dipolar aprotic solvent is N-methyl pyrrolidone and the added cyanide is sodium cyanide.

References Cited

Oku et al., Die Makromolecular Chemie, 78, pp. 186–193, 1964.

DONALD E. CZAJA, Primary Examiner

M. J. WELSH, Assistant Examiner

U.S. Cl. X.R.

161—190; 260—2.5 R, 47 CB